United States Patent [19]
Walls

[11] Patent Number: 5,675,790
[45] Date of Patent: Oct. 7, 1997

[54] METHOD FOR IMPROVING THE PERFORMANCE OF DYNAMIC MEMORY ALLOCATION BY REMOVING SMALL MEMORY FRAGMENTS FROM THE MEMORY POOL

[76] Inventor: Keith G. Walls, P.O. Box 771, Hudson, N.H. 03051-0771

[21] Appl. No.: 386,322

[22] Filed: Feb. 10, 1995

Related U.S. Application Data

[63] Continuation-in-part of Ser. No. 51,391, Apr. 23, 1993, abandoned.

[51] Int. Cl.⁶ .................................................. G06F 12/02
[52] U.S. Cl. .................................. 395/621; 395/497.02
[58] Field of Search ............................ 395/621, 622, 395/497.01, 497.02, 497.03

[56] References Cited

U.S. PATENT DOCUMENTS 5,088,036  2/1992  Ellis et al. .................................. 395/425
5,247,634  9/1993  Cline et al. ................................. 395/425

OTHER PUBLICATIONS

Peters, Paul Eugene, Dynamic Memory Allocation PhD Dissertation University of Maryland 1968 (Available from UMI Dissertation Services).

Primary Examiner—Thomas G. Black
Assistant Examiner—Jack M. Choules
Attorney, Agent, or Firm—Vernon C. Maine

[57] ABSTRACT

A method for optimizing dynamic memory pool structures is presented. The size of unusable segments of dynamic memory is determined dynamically and those small segments are safely removed from the dynamic memory pool and placed on a separate list. Periodically or when dynamic memory is in heavy demand, the contents of the separate list are agglomerated and returned to dynamic memory for use. Consequently the time taken to search for a suitably-sized segment of dynamic memory is reduced considerably.

9 Claims, 4 Drawing Sheets

METHOD FOR IMPROVING THE PERFORMANCE OF DYNAMIC MEMORY ALLOCATION BY REMOVING SMALL MEMORY FRAGMENTS FROM THE MEMORY POOL

This application is a continuation-in-part of application Ser. No. 08/051,391 filed Apr. 23, 1993, now abandoned.

BACKGROUND OF THE INVENTION

This invention relates to improving the efficiency with which memory can be allocated from certain memory management structures for computing software.

A typical computer system will be provided with an operating system whose function is to present services and resources to the consumers (device management software, users, user processes, or other parts of the operating system). In providing service, the operating system declares management ownership of the resources and then delivers to consumers only the portion of those total resources required to complete a particular task, and only for the duration necessary to accomplish the task. In many instances, it is the responsibility of the consumer to return the resource to the operating system management software so that it can be re-used for other consumers.

In the case of modern computers and operating systems, the quantity of memory available is large and is truly divisible between consumers who operate coincidentally. That is, if a particular computer system is configured with 128 million bytes of memory and there are 128 consumers, each consumer can be granted exclusive access to 1 million bytes. Once each consumer has completed its task, it will terminate and return its share of the memory resource to the operating system for use by another consumer.

In the case of multi-user computing systems and their related operating systems, it is required that each user be protected from all other users. In this instance, operating systems may divide memory into several parts. One part is allocated for the exclusive use of the operating system code and related data. Another part is allocated to memory "pools" which represent a secure means by which consumers can pass requests to the operating system. The remainder is divided between site-specific requirements and the user population for their own purposes.

Input and Output devices fall into two categories with regard to their speed in delivering or accepting data transfer: fast and slow. Fast devices are capable of delivering or accepting data in the order of several thousands of bytes per second (examples are most modern magnetic tapes, optical and optimagnetic disks). Slow devices are capable of delivering or accepting data at rates ranging from several bytes per second up to several hundreds of bytes per second (examples are user keyboard input, printer output and communications devices such as MODEMs and remote devices.)

In order to service requests for input or output from either speed category, the operating system must manage the devices and the data being transferred between those devices and main memory differently. Thus arises the purpose for 'Dynamic Memory' utilization.

When a multi-user computer accessor (user) runs a computer program requesting input from or output to a 'slow' device, the operating system will respond by allocating sufficient memory to store the transferred data (for movement in either the input or output direction) temporarily in a protected area of memory. In the case of output to a slow device, the data is transferred to this temporary memory area and is written to the device directly from that temporary area. In the case of input from a slow device, the temporary memory area is allocated by the operating system and data transferred from the device is placed directly into that temporary memory location. Once the data transfer is complete, the operating system de-allocates the previously allocated memory and makes it available for another user's temporary needs.

The memory that is provided by the operating system for this transient purpose is referred to by several names: 'Dynamic Memory', 'Pool Memory', 'System Dynamic Memory' and simply 'Pool', to name the more common.

Dynamic memory of this kind is employed by several commercially available operating systems. Amongst these are Digital Equipment Corporation's OpenVMS, Microsoft's Windows NT, Digital Equipment Corporation's RSX-11M and RSX-11M+ operating systems for the PDP-11 computers and several implementations of the UNIX operating system, including Hewlett-Packard's HP/UX, Digital Equipment Corporation's OSF/1, International Business Machines' AIX and SUN's Solaris.

Memory "pools" are created by the operating system and their entire content is protected against direct consumer modification. When a consumer requests service, the operating system will allocate a portion of pooled memory to represent the request. All security checking and hardware-related requests are derived directly from this protected structure so that the consumer may not alter the requests or responses to suit their own purposes.

In addition, at least one of the memory pools will be declared by the operating system to be non-pageable. That is, the operating system declares that the memory can never be temporarily stored on secondary storage. Pool memory that is declared non-pageable is termed "non-paged pool". Pool memory that may be paged to secondary storage is termed "paged pool".

Memory "pools" are managed by a particular set of data structures and accompanying algorithms. At any given time, only a single consumer may manipulate (or cause the operating system to manipulate) the actual data structures which manage the memory pool. The operating system takes responsibility for the integrity of the data structures governing pool and so is responsible for serializing access to pool. In general, since all consumers will typically allocate and de-allocate portions of pool frequently, the cost of the serialization of access to pools becomes very high. The cost increases in proportion to the number of consumers and in relation to the various serialization techniques employed in hardware and in software. The most apparent cost is that if several consumers collide in their need for pool memory, their requests must be serialized, meaning that each new consumer must wait for other preceeding requests to complete their request. This cost also increases as the number of processors in a multi-processor environment increases because all processors share the same memory pool and data structures. In this instance, the number of consumers (and therefore potential waiters) increases and so the aggregate allocation rate increases. Correspondingly, there is greater opportunity for collision.

A multi-processor is implemented as several processors with access to the same physical memory. One of the more significant technical aspects to the architecture of multi-processing systems is designing a means by which operating system management algorithms and control structures can be protected from destructive coincidental manipulation. In systems where there is more than one processor, it is possible for two users to make simultaneous requests for dynamic memory. It is necessary for an operating system to prevent the allocation of the same sections of dynamic memory to two or more processes. Most operating systems implement a 'locking' scheme whereby a user must first take 'ownership' of a lock before gaining access to a protected entity.

Dynamic memory pools are protected by exactly such a locking mechanism. Consequently, when a user has 'ownership' of the lock preventing access to a dynamic memory pool, other users who need to allocate dynamic memory must wait until the first user has completed their task. Thus it is possible for all processors in a multi-processor system to be placed in a wait state while a single user completes an allocation or de-allocation request. The longer the time taken by each user to perform a dynamic memory operation (allocation or de-allocation) the longer the wait by other users.

In order for any method to participate in the management of dynamic memory it must conform to the locking and synchronization techniques and paradigms presented by the operating system. This is necessary since failure to adhere to operating system synchronization methods would place the system's integrity at risk. Many operating systems detect such failures to comply and stop the system to prevent data corruption and loss. The invention therefore provides for pure software and hardware-assisted synchronization to be adhered to.

As computer systems evolve, the number of pool consumers increases. In some instances the increase in the number of pool consumers is due to the increase in the number of users; in other instances, it is due to an increase in remote services provided or demanded. Since many service providers, both locally and remotely, present secure services, the reliance of modern systems on pool structures is growing as the evolution continues.

Even with a small number of consumers, memory pools become fragmented. Pool fragmentation is exacerbated by greater numbers of users. Pool fragmentation is described under the heading "Description of the Preferred Embodiments".

There are two primary goals of operating systems' management of dynamic memory pools. Firstly, that segments of dynamic memory pool are made available as required for servicing users' needs. Secondly, that dynamic memory is available quickly and efficiently with a minimum of unnecessary overhead or extended wait periods.

Several mechanisms for accelerating dynamic memory allocation have been presented in the implementation of operating systems. Digital Equipment Corporation's Open VMS presents a mechanism known as 'look-aside lists'. Look-aside lists present an alternative to allocating memory from a dynamic memory pool. Whereas a dynamic memory pool is created to be sufficiently large to accommodate many temporary memory segments, look-aside lists are pre-allocated by the operating system to contain discrete packets of fixed length. When a user requests allocation of dynamic memory, the operating system routine servicing the request will first determine whether an element from one of the fixed-size look-aside lists will service the request. This presents a faster mechanism for allocating dynamic memory because no search must be undertaken to locate a segment of dynamic memory of sufficiently large size. Rather, based on the size of the requested segment, a segment of the appropriate size is know to reside on the selected look-aside list. For example, the dynamic memory allocation algorithm implemented in Digital Equipment Corporation's Open VMS has the following form:

System routine entry:
Examine size of segment requested
Can the request be serviced from a look-aside list?
   If Yes, allocate a look-aside list element and return its address to the user
   If No, find the address of the first free segment of the dynamic memory pool
   Try-again:
      Examine size of this free segment of the pool
      Is this segment large enough to satisfy the request?
      If Yes, remove segment from pool; return the address to the user
      If No, follow forward-pointer to next available segment
      If the forward-pointer is zero, expand the pool if possible, else the allocation failed
      Go back to 'Try-again'

A similar algorithm is described by Peters (Doctoral Thesis, University of Maryland, 1968).

It is therefore more efficient to allocate dynamic memory from a look-aside list than from the dynamic memory pool since no searching is involved to allocate a look-aside list entry. Conversely, many thousands of iterations of the 'Try-again' loop may be required to find a segment of dynamic memory of the appropriate size.

Even though the look-aside list allocation method is more efficient than dynamic memory pool searching, not all allocation sizes can be accommodated by look-aside lists because of the high cost of storing multiple unallocated packets which can service only a small subset of the total requests submitted. Consequently only a small number of look-aside lists are pre-allocated. In the case of Digital Equipment Corporation's Open VMS operating system, the number of look-aside lists varies between 3 and 80, depending on the version of Open VMS under consideration.

In addition to the look-aside list approach to performance enhancement, several other recognitions are made of the existence of the performance issue with multiple searches through a dynamic memory pool structure. P. E. Peters (Doctoral Thesis, University of Maryland, 1968) recognizes the existence of the performance impact of a fragmented dynamic memory pool. Peters presents an approach whereby segments remaining in pool whose size is smaller than a fixed value are declared 'JUNK' blocks and are removed from the pool to prevent unnecessary search cycles.

When an allocation is in progress, the system routine executing to service the request must locate the first unallocated segment whose size is equal to or greater than the size requested. This is the basis of a 'first-fit' algorithm. In this instance, the segment remaining after the request is satisfied is left in the dynamic pool. That is, a request will be serviced precisely. Peters suggests that when a block is allocated, the portion remaining be compared with the static 'JUNK' size. Peters then proposes that 'JUNK' portions should not be returned to the pool because of the performance loss caused by the presence of 'JUNK' segments.

SUMMARY OF THE INVENTION

In general, the invention presents a method by which memory pool fragmentation can be eliminated so that a consumer allocating pool can allocate the required pool memory very quickly. In allocating pool memory quickly, the consumer will more quickly release serialized access to the pool structure and so reduce the delay to other potential consumers.

The principle employed by the invention is that portions of memory pools that are too small to be useful to consumers are removed from the pool. In so doing, the invention increases the performance of each consumer and therefore of the overall system. Thus, somewhat ironically, the invention increases the efficiency of a resource by consuming selected portions of that same resource.

While several implementations of dynamic memory allocation and P. E. Peters' Doctoral Thesis (University of Maryland, 1968) demonstrate awareness of the implications of performance loss from protracted searches for appropriately sized segments, none presents a means by which these performance losses can be adequately addressed.

As well as removing portions of dynamic memory pool that cannot be used by consumers, the invention also presents a means by which dynamic memory exhaustion can be avoided. This is accomplished by storing the portions deemed too small on a separate list This separate list is managed so that multiple un-allocated segments of memory, that are also physically contiguous, can be agglomerated and replaced in the general dynamic memory pool for allocation when the size of the agglomerated list entry is sufficiently large to be useful to consumers.

DESCRIPTION OF THE PREFERRED EMBODIMENTS

We first briefly describe the drawings.

STRUCTURE

Figure 1:
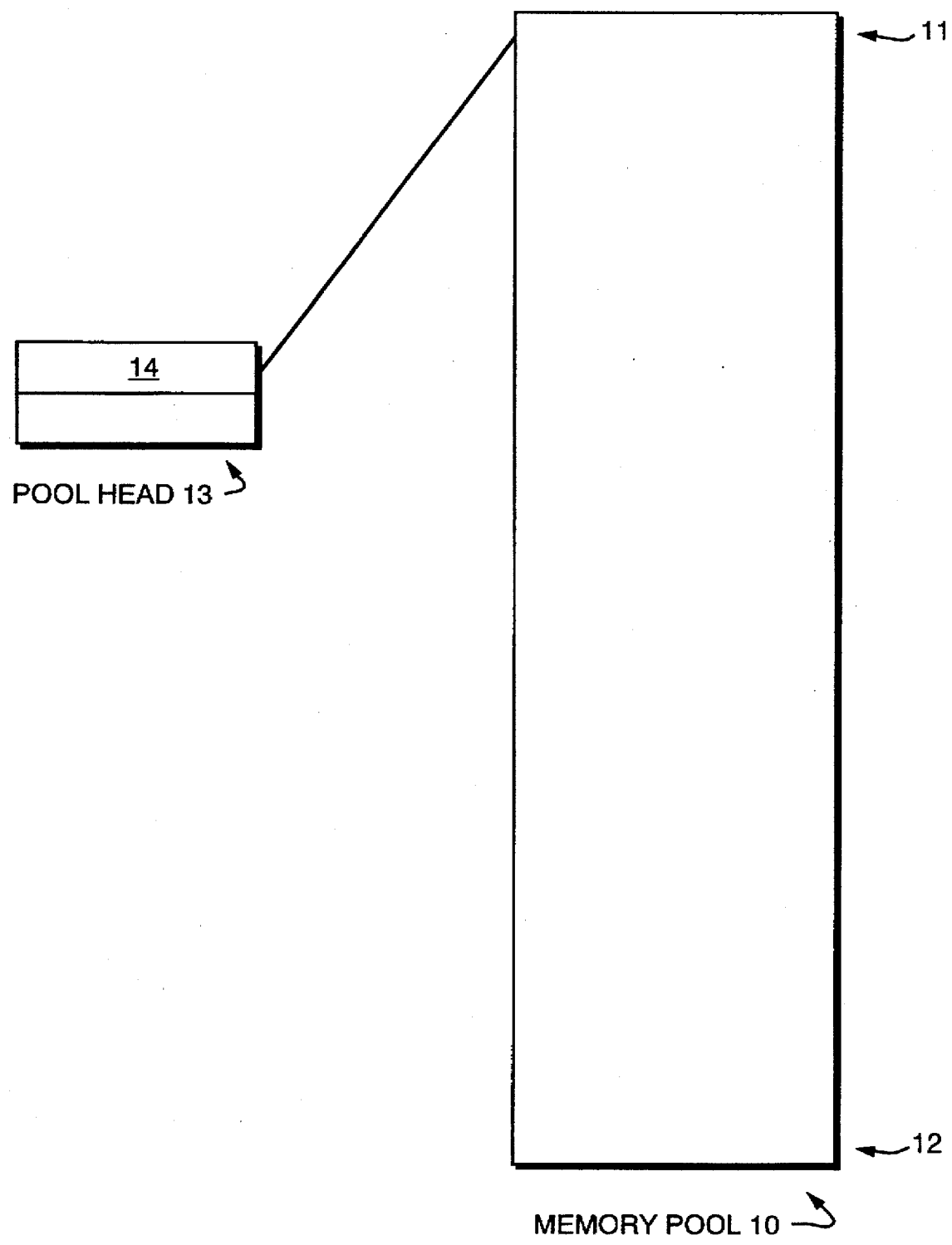
FIG. 1 is a diagram of a block of memory that has been assigned to the purpose of pool memory.

Referring to FIG. 1, the memory allocated to a pool may be schematically represented by a vertical block, 10, with the lower addresses being toward the top, 11, and the higher addresses being toward the bottom, 12. The pool-head, 13, resides in operating system memory and contains the address of the first (lowest address) portion of unallocated pool, 14. The arrow, 16, represents the connection, by pointer, between the pool-head and the pool address. FIG. 1 represents a memory pool that has not had any memory allocated from it.

Figure 2:
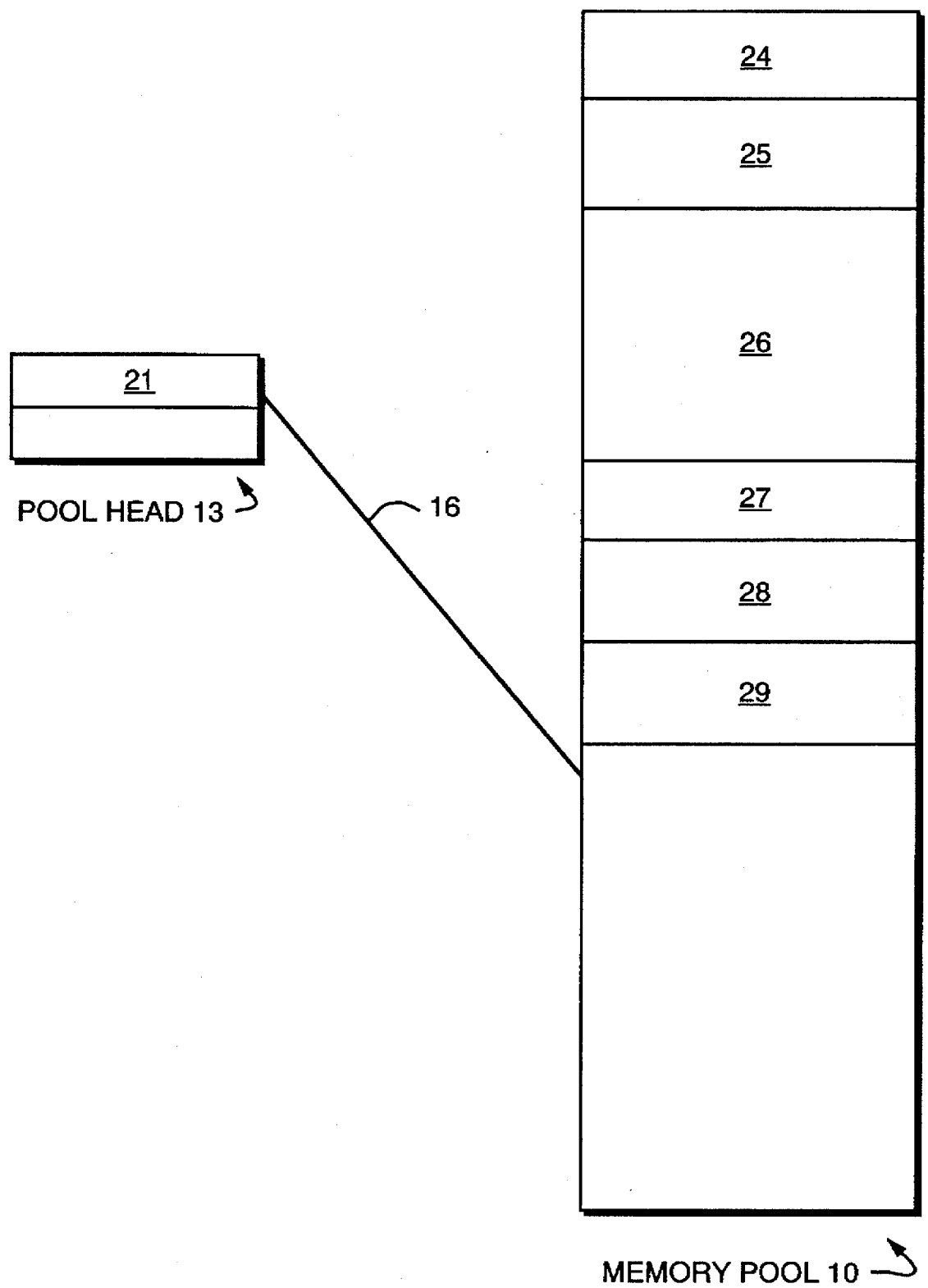
FIG. 2 is a diagram of the same block of pool memory that has had several portions allocated from it.

Referring to FIG. 2: After several consumers have allocated portions of pool, the data cell containing the operating system pool-head pointer, 21, will hold the address of the new first available free portion of memory. The mow, 16, represents that the operating system has maintained the address of the first portion of unallocated pool. The blocks depicted by labels 24, 25, 26, 27, 28 and 29 are the portions of pool that have been allocated by consumers.

Figure 3:
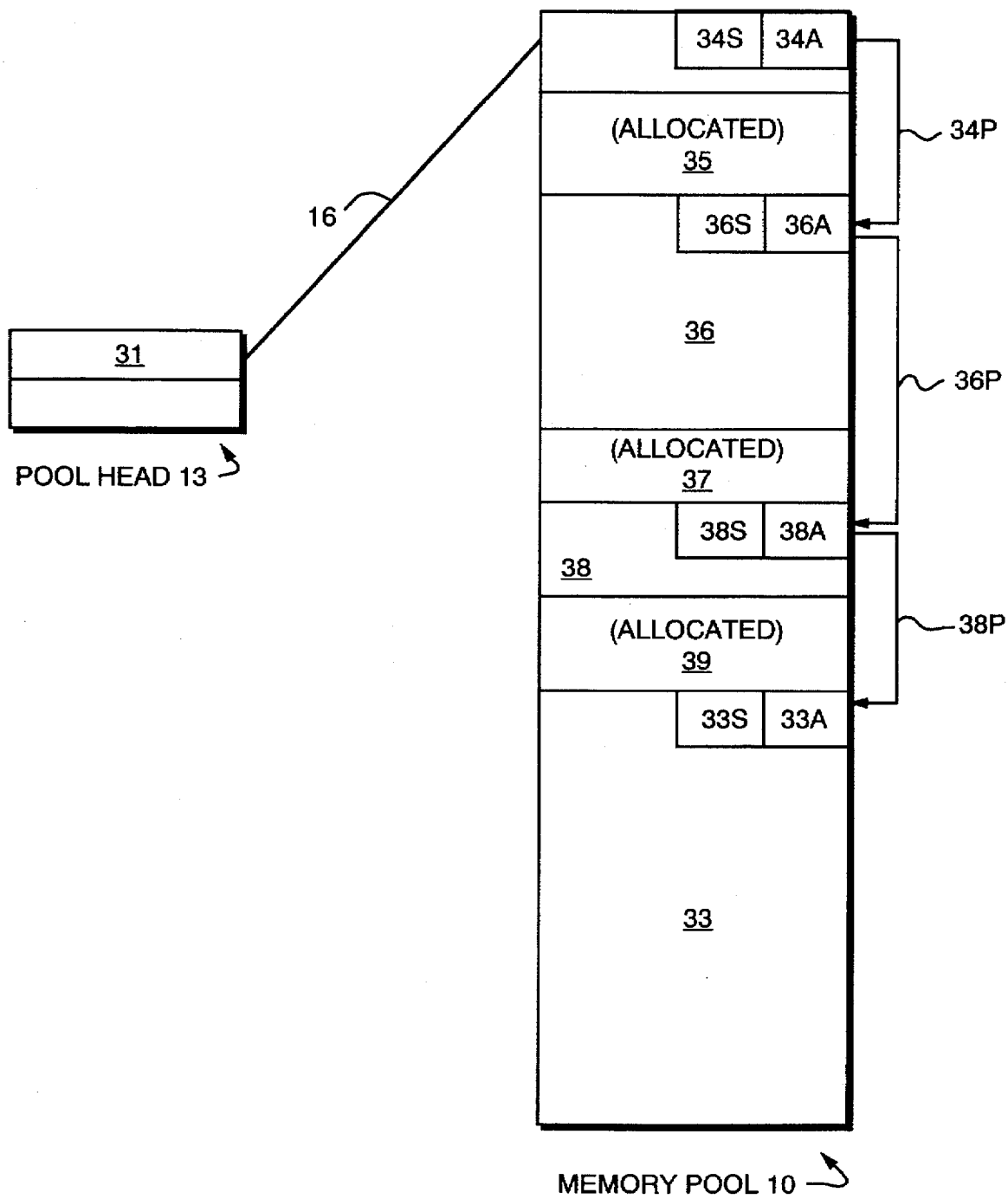
FIG. 3 is a diagram of the same block of pool memory that has become severely fragmented as a result of multiple allocations and de-allocations by consumers.

Separate consumers operate independently, running their own programs, accepting input from hardware devices and presenting output to hardware devices. It is therefore highly likely that pool memory will be de-allocated in an order different from that in which it was allocated. Since the memory pool is of finite size, and the operating system must support multiple consumers indefinitely, the memory pool portions must be recycled. FIG. 3 represents the same memory pool as that represented in FIG. 2, after some of the portions have been returned by the consumers.

In particular, from FIG. 2, consider that the blocks 24, 26 and 28 are returned by their consumers. FIG. 3 now presents the manner in which the operating system must manage the pool structure to permit recycling the memory. With reference to FIG. 3, data cell 31 contains the address of the first unallocated portion of pool. The pointer, 16, was adjusted as pool was returned by consumers. Since the lowest address (first) unallocated pool is portion, 34, the operating system data cell, 31, indicates that portion's address.

Because the memory pool consists of more than a single free portion, the free portions are linked together. The first two slots in each portion are assigned the purpose of linking the free portions together in a manner similar to which the first free portion is indicated by the poolhead, 13, except that the size of the free portion is now also stored.

Again referring to FIG. 3, the pointer $34p$ contains an address indicator, 34A, of the next free portion of pool, 36A, and the size indicator, 34S, contains the size of portion 34 of pool. Similarly, pointer 36P contains the address indicator, 36A, of free portion 38 and the size of portion 36 is stored in 36S. The pool free portions are linked together in this manner until the last free portion is encountered. At the last block 33, the address indicator, 33A, contains the numeric value 0 to indicate that there are no further unused portions of the pool. The size indicator, $33s$, contains the size of the last unused portion, 33.

The fact that the unallocated space is left in more than one contiguous piece is termed fragmentation. The longer the computer runs, and the more consumers there are to allocate and de-allocate portions of pool memory of different sizes, the more significant the fragmentation becomes. Typically, the structure of pool memory will degrade to the point where there are many small unallocated portions at the lower addresses and one or two large unallocated portions at the higher addresses.

The consequence of pool fragmentation is that consumers are delayed for increasingly long periods of time in order to allocate portions of pool memory. The reason for this is that the operating system must read through the linked structure until it encounters an unused portion of sufficient size to satisfy the request. Since the operating system must serialize access to the pool structure, the operating system can make little other progress while the pool structure is scanned and manipulated.

The invention periodically scans all memory pools and consumes those unallocated portions which are of insufficient size to satisfy most incoming requests. Those portions which are deemed unsuitably small are removed from pool by directly allocating that portion, thereby simulating a consumer who encountered precisely the appropriately sized portion.

The portions of dynamic memory pool which are allocated by the invention are maintained on a separate list. This serves two purposes. Firstly the portions are removed from the dynamic memory pool and so no longer impede the search for other blocks which are more likely to be allocated. Secondly, the separate list allows the maintenance of the availability of these portions. Since the memory structure is used for temporary allocation, it is likely that portions allocated by users will be returned by those users. Once portions are returned by users, it is possible that the returned portions will be physically adjacent to other portions held in the separate list. In this event, the invention provides for concatenating physically adjacent portions in the remaining dynamic memory, in the separate list or between the two, so that a larger, agglomerated portion can be returned to the dynamic memory pool which will be likely to be used by users. To this end, the invention provides a means to maintain the cumulative size of physically adjacent segments. Each group of physically adjacent segments on the separate list is concatenated to form a single, larger segment. Once the size of any such agglomerated segment is of appropriate size to be likely to be allocated by users, it is returned to the dynamic memory pool to be made available for users. This carries the benefit that dynamic memory will not be exhausted unnecessarily.

For any given operating system implementation, certain 'look-aside' lists may be implemented to accelerate the delivery of certain ranges of dynamic memory allocation requests. In these cases, it can be determined that any segment of pool whose size is smaller than or equal to the size of the smallest look-aside list packet size can never be allocated from the dynamic memory pool because the look-aside list is always examined before the dynamic memory pool.

The previous statement can be generalized: For all look-aside lists implemented, any unallocated segment in the dynamic memory pool whose size falls in the same size range as any look-aside list can never be allocated because the look-aside list will always be examined before the dynamic memory pool.

Since these segments of memory can never be allocated, but since the structure of the dynamic memory pool is such that unused segments must be searched sequentially (FIG. 3.), it is deemed that searching through segments that can never be allocated is 'wasted searching'.

This invention determines the size ranges of those dynamic memory pool segments which can never be used. This information is then used to set the default action of the invention, being to remove segments of dynamic pool memory which can never be allocated. This action has the effect of reducing the number of iterations (and thus the duration) of any search through the dynamic memory pool. Since the action of 'searching' consists of repeatedly following pointers through the dynamic memory pool until a suitably sized segment is located, it falls to the system's processor unit to perform the 'searches'. Thus, the effect of the invention is to reduce the processor cost and elapsed time consumed in locating an appropriately-sized segment of dynamic memory whose size falls outside the range serviced by any look-aside list.

In cases of operating systems or dynamic memory pools where no pre-search look-aside lists are implemented, the invention determines the least frequently allocated segment sizes by automatically monitoring the dynamic pool. By observing a dynamic memory pool repeatedly the sizes of segments rarely requested by consumers (users) will remain unallocated for long periods of time. Once it is determined that an unallocated segment remains unallocated by a user for more than a few seconds during which the computer system is active, it is necessarily the case that the segment is being examined during the search process but is not large enough to satisfy the given request.

In addition to improving the efficiency of dynamic memory allocation, the invention also improves the efficiency of dynamic memory de-allocation. Dynamic memory allocation and de-allocation are described by several implementations and by documented accounts (P. E. Peters, Doctoral Thesis, University of Maryland, 1968). In all cases, it is required that when an allocated segment is returned to the dynamic memory pool from whence it was allocated, it must be returned to the exact same position in the memory structure. That is, dynamic memory pools must always be maintained in physical address order. When a segment of dynamic memory is returned to the pool, the pool must once again be scanned, starting at the top (low addresses) and working towards the end (high addresses) to determine where the segment being de-allocated must reside.

The invention reduces the total number of unallocated segments in the dynamic memory pool. Therefore, since there are fewer segments through which to scan, the time taken to return (de-allocate) a segment is also reduced.

The invention can operate independently of the operating system routines responsible for the allocation and de-allocation of dynamic memory. If implemented independently of the operating system routines, the invention synchronizes its access to system-owned data structures to prevent corruption and data loss. Thus the invention can operate in one of two modes—as part of the operating system or independently from it. In either case, the invention monitors the dynamic memory pool state.

Every few seconds, or on any allocation or de-allocation event, the invention scans the dynamic memory pool by traversing the entire search chain. As dynamic memory is traversed, the size of each unallocated segment is known. In each case, this size is compared with the previously determined size of segments which can never be allocated or which is unlikely to be allocated. Every un-allocated segment whose size is smaller than this minimum size is removed from the pool and placed in address order on the separate list. The logic flow is as follows:

Entry:
  Find beginning of dynamic memory free list from system data cell
  Loop through pool:
    Compare the size of this segment with minimum size
    If the segment is smaller than the minimum size Then Remove (allocate) the segment from the dynamic memory pool Insert the segment into the separate list in its address order on that list
    Follow the forward pointer to the next un-allocated segment If the pointer value is zero, the end of the chain has been reached; exit. Otherwise go to 'Loop through pool:'

This is know as the invention's 'allocation loop'.

When it is observed that the dynamic memory pool is becoming consumed, or on a regular timed basis, the invention provides a means to reclaim memory from the separate list and place it back into the generally-available dynamic memory pool. This 'reclamation' event has three major components:

(i) Loop through the separate list and agglomerate all physically adjacent packets (agglomeration)
  (ii) Loop through the dynamic memory pool and locate all un-allocated segments which are adjacent to segments stored in the separate list (determine adjacency)
  (iii) Return segments from the separate list if either of two conditions are met:
    a) The separate list entry (now agglomerated) is large enough to be likely to be allocated
    b) The separate list entry is physically adjacent to an un-allocated entry in the dynamic This is known as the invention's 'reclamation event'. Together, the allocation loop and the reclamation event form the major advancement in dynamic memory management beyond the existing technology.

Figure 4:
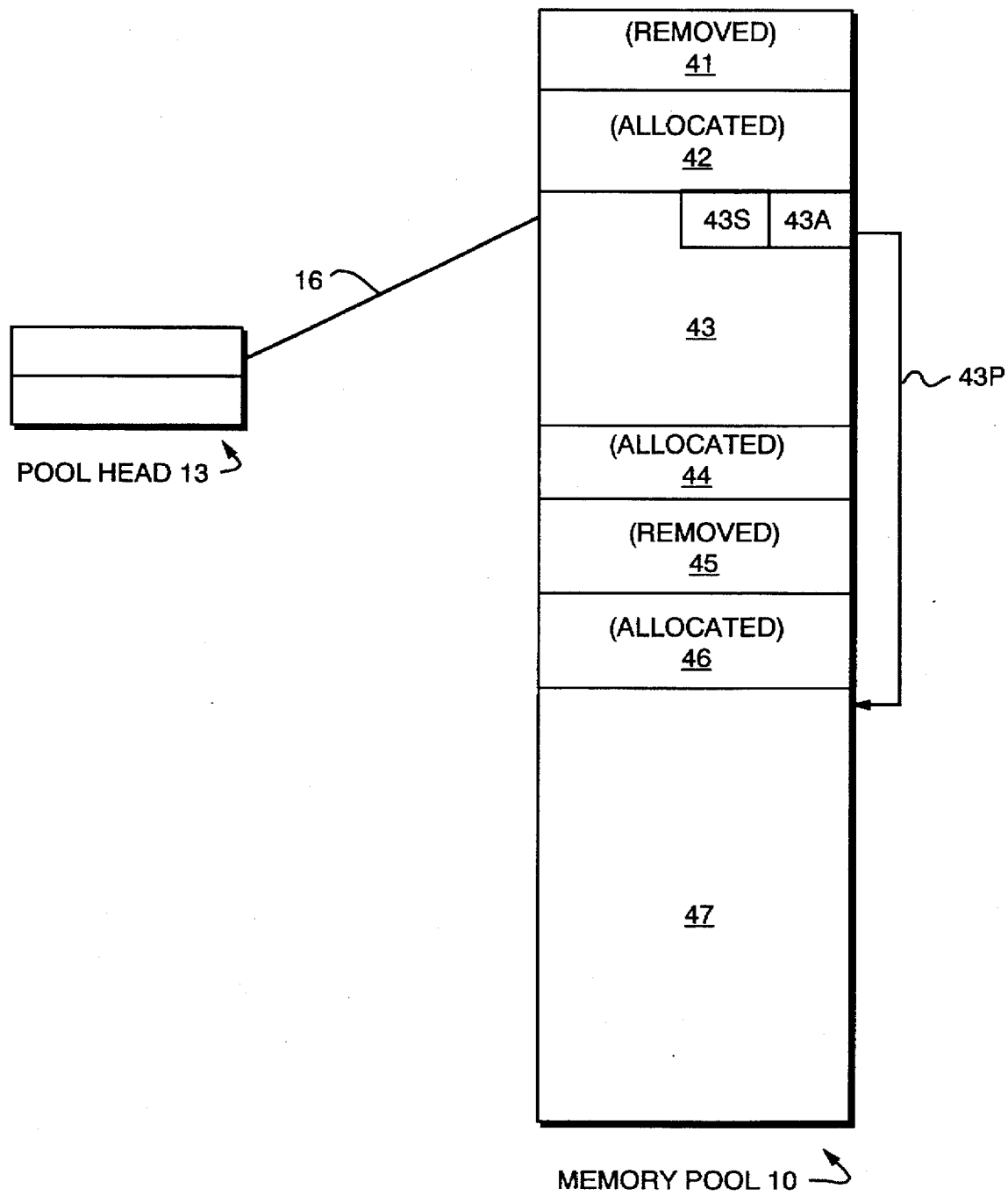
FIG. 4 is a diagram of the same block of pool memory that has been treated to streamlining by this invention.

The results of this action are presented in FIG. 4. Portions 42, 44 and 46 are allocated by consumers. Portions 41 and 45 are deemed by the invention to be too small to be useful and so are consumed by the invention. Portion 43 is deemed large enough to be useful and so is left for consumer allocation.

The pool-head pointer, 16, now indicates portion 43 as the first available portion. The pointer address 43A in portion 43, indicates portion 47 as the next available unallocated portion, and pointer 43P points to that location.

Comparing FIG. 3 and FIG. 4 presents the achievement of the invention. In FIG. 3, a consumer must endure a search through pointers 16, 34P, 36P, and 38P before successfully locating unallocated section 33. By contrast, in FIG. 4, the same consumer must follow only two links, 16 and 43p, to locate the same portion of pool. In this example, the search duration has been halved. Typically, the search duration will be reduced by many hundreds, or even thousands, of links as a result of the invention.

In addition to periodically scanning for small blocks, the invention also periodically, though less frequently, scans its allocated portions to determine whether there are adjacent portions of unallocated space that, if released back to pool, would together constitute a larger portion that would be useful to consumers. If such adjacent portions are located, they are together released back to the memory pool.

Other embodiments are within the following claims.

I claim:

1. A computer executable method to increase performance of allocation and de-allocation of memory in a dynamic memory pool, said computer executable method having at least one list of memory segments available for allocation, said computer executable method also maintaining a separate list consisting of unallocated memory segments that are not to be allocated, the computer executable method comprising the steps of:
    a) automatically determining by periodic observation a small segment size below which memory segments are not likely to be allocated;
    b) periodically removing small memory segments of said small segment size from the dynamic memory pool and placing them on said separate list;
    c) agglomerating the small memory segments listed in said separate list by periodically searching said separate list for physically adjacent memory segments add concatenating said physically adjacent segments to form larger memory segments;
    returning said larger memory segments to said list of memory segments available for allocation if the size of said larger memory segment is greater than said small segment size; and
    e) returning memory segments from said separate list by periodically finding small segments on said separate list that are physically adjacent to any unallocated segment in the dynamic memory pool and concatenating said small segments with the adjacent unallocated segment in the dynamic memory pool.

2. The computer executable method according to claim 1 wherein the small segment size can be modified for optimal system performance.

3. The computer executable method according to claim 1 wherein the small segment size is determined by monitoring the dynamic memory pool for requested segment sizes and determining said small segment size based on said requested segment sizes.

4. The computer executable method according to claim 1 wherein said small segment size is determined by the amount of time that the unallocated segment remains active.

5. The computer executable method according to claim 1 wherein said memory segments from said separate list that are physically adjacent to any unallocated segment in the dynamic memory pool are concatenated with the memory segments from said separate list if the combined memory size is equal to or greater than the small segment size.

6. A computer executable method to increase performance of allocation and de-allocation of memory in a dynamic memory pool, said computer executable method having at least one list of memory segments available for allocation, said computer executable method also maintaining a separate list consisting of unallocated memory segments that are not to be allocated, the computer executable method comprising the steps of:
    a) determining a small segment size below which memory segments are not likely to be allocated by setting said small segment size to a look-aside list memory segment size;
    b) periodically removing small memory segments of said small segment size from the dynamic memory pool and placing them on said separate list;
    c) agglomerating the small memory segments listed in said separate list by periodically searching said separate list for physically adjacent memory segments and concatenating said physically adjacent segments to form larger memory segments;
    d) returning said larger memory segments to said list of memory segments available for allocation if the size of said larger memory segment is greater than said small segment size; and
    e) returning memory segments from said separate list by periodically finding small segments on said separate list that are physically adjacent to any unallocated segment in the dynamic memory pool, and concatenating said small segments with the adjacent unallocated segment in the dynamic memory pool.

7. The computer executable method according to claim 6 wherein said look-aside list memory segment size is predetermined by a default setting specific to the operating system.

8. The computer executable method according to claim 6 wherein said look-aside list memory segment size can be modified for optimal system performance.

9. The computer executable method according to claim 6 wherein said memory segments from said separate list that are physically adjacent to any unallocated segment in the dynamic memory pool are concatenated with the memory segments from said separate list if the combined memory size is equal to or greater than the small segment size.

* * * * *